(12) United States Patent
Lay et al.

(10) Patent No.: US 7,385,728 B2
(45) Date of Patent: Jun. 10, 2008

(54) SYSTEMS AND METHODS FOR OPTIMIZING PRINTING

(75) Inventors: Daniel Travis Lay, Meridian, ID (US); Curtis Reese, Boise, ID (US); Brett Green, Meridian, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 981 days.

(21) Appl. No.: 10/269,196

(22) Filed: Oct. 3, 2002

(65) Prior Publication Data

US 2004/0066524 A1 Apr. 8, 2004

(51) Int. Cl.
*G06K 1/00* (2006.01)
*G06F 15/00* (2006.01)

(52) U.S. Cl. .................... 358/1.6; 358/1.1; 358/1.15

(58) Field of Classification Search ............. 358/1.13, 358/1.14, 1.15, 1.12, 1.1, 1.6; 382/162
See application file for complete search history.

(56) References Cited

U.S. PATENT DOCUMENTS

| | | | | |
|---|---|---|---|---|
| 5,806,081 A * | 9/1998 | Swen et al. | ............... | 715/528 |
| 6,281,992 B1 * | 8/2001 | Kondo | ............... | 358/501 |
| 6,307,961 B1 * | 10/2001 | Balonon-Rosen et al. | .. | 382/167 |
| 6,337,922 B2 * | 1/2002 | Kumada | ............... | 382/162 |
| 6,728,428 B1 * | 4/2004 | Kinjo | ............... | 382/309 |
| 6,897,988 B1 * | 5/2005 | Saito et al. | ............... | 358/515 |
| 6,954,288 B2 * | 10/2005 | Uekusa et al. | ............... | 358/1.9 |
| 6,975,416 B2 * | 12/2005 | Tomita | ............... | 358/1.13 |
| 7,003,151 B2 * | 2/2006 | Shimada | ............... | 382/162 |
| 7,012,706 B1 * | 3/2006 | Hansen | ............... | 358/1.15 |

* cited by examiner

*Primary Examiner*—Thomas D Lee

(57) ABSTRACT

Disclosed are systems and methods for print optimization. In one arrangement, a system and a method pertain to determining a source of print data, determining whether a print profile is available for the print data source, and manipulating the print data using the print profile if it is determined that there is a print profile for the print data source.

10 Claims, 7 Drawing Sheets

SYSTEMS AND METHODS FOR OPTIMIZING PRINTING

FIELD OF THE DISCLOSURE

The present disclosure relates to printing. More particularly, the disclosure relates to systems and methods for optimizing printing based upon knowledge of the source that originated the data to be printed.

BACKGROUND

Printing devices are normally used as peripheral devices to host devices such as personal computers (PCs). In that data is typically manipulated in different formats by PCs and printing devices, data is usually translated by driver software stored on the PC prior to being provided to the printing device for hardcopy generation. Such driver software normally must be installed for each printing device to which data will be sent from the PC.

The driver software for any given printing device is usually developed so as to obtain the best printing results possible for the widest variety of print data. For instance, the driver software may be written so that generally acceptable results will be obtained whether the user is printing text or image data (e.g., photographs). Accordingly, such driver software is intentionally engineered to be generic with respect to the data to be printed instead of being optimized for one particular type of printing. In addition, most driver software is further generic in regard to the device that originated the data. Accordingly, the software is written so that, for example, acceptable results may be obtained irrespective of whether image data was captured by one brand of digital camera or another.

In some circumstances, better printing results may be obtained if the driver software is configured to accommodate the specific type of print data it receives. For instance, if a high quality digital image is caught with a high-end digital camera, better printing results will be obtained if the driver software is configured so as to accommodate the high resolution and intricate color composition of the image. Such configuration can be obtained by manually changing the settings of the driver software through a user interface. By way of example, a typical interface may simply provide an option for "best" quality printing or a "photo" printing option. Although the options selected by the user may improve the printing results over the standard configuration of the driver software, the particularities of the print data, or the originating device from which this data came, typically is not taken into consideration. This is unfortunate in that even better results could be obtained where the driver software is specifically configured for particular print data from a particular device. In such a case, the driver software could be optimized to facilitate the best printing possible.

From the above, it can be appreciated that it would be desirable to have a system and method with which the configuration of driver software may be optimized in view of print data and/or the device from which the data originated.

SUMMARY

The present disclosure relates to systems and methods for print optimization. In one arrangement, a system and a method pertain to determining a source of print data, determining whether a print profile is available for the print data source, and manipulating the print data using the print profile if it is determined that there is a print profile for the print data source.

BRIEF DESCRIPTION OF THE DRAWINGS

The systems and methods disclosed herein can be better understood with reference to the following drawings. The components in the drawings are not necessarily to scale.

DETAILED DESCRIPTION

Disclosed herein are systems and methods with which printing may be optimized. With these systems and methods, the configuration of a print driver for a given printing device may be modified with reference to print optimization information regarding the data to be printed and/or the device from which the data originated. Example systems are first discussed with reference to the figures. Although these systems are described in detail, they are provided for purposes of illustration only and various modifications are feasible. After the example systems have been described, examples of operation of the systems are provided to explain the manners in which printing optimization can be achieved.

Figure 1:
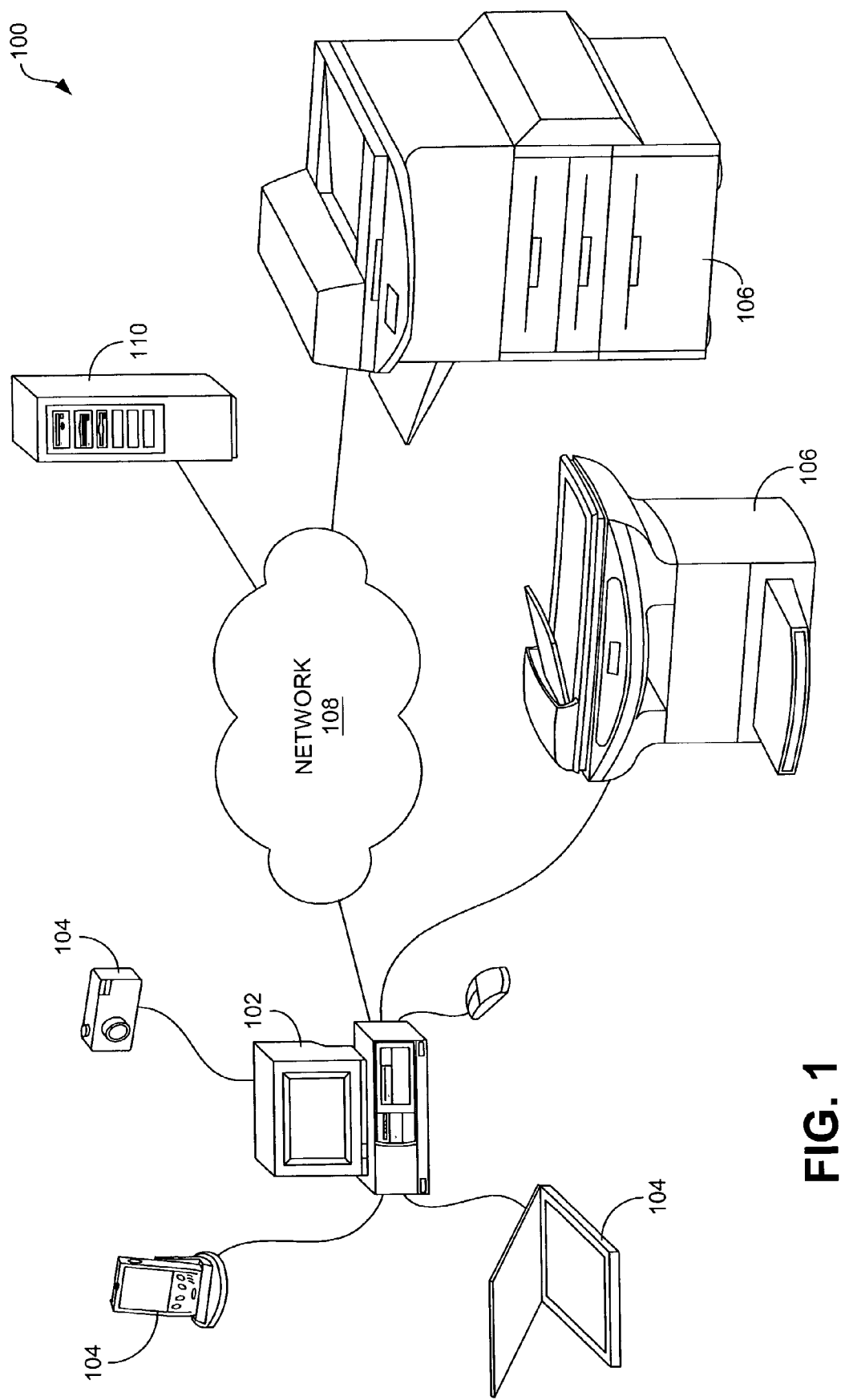
FIG. 1 is a schematic view of an embodiment of a system in which printing may be optimized.

Referring now in more detail to the figures in which like numerals identify corresponding parts, FIG. 1 illustrates an example system 100 in which printing optimization may be obtained. As indicated in this figure, the system 100 generally comprises a user computing device 102 to which several print data sources 104 may be connected (either through an actual wired connection or a wireless connection). As depicted in FIG. 1, the computing device 102 may comprise a personal computer (PC). Alternatively, however, the computing device may comprise any other device that is capable of configuring data for printing on a printing device. The data sources 104 comprise substantially any device that provides data to the computing device 102 for manipulation and/or transmission to a printing device. As shown in FIG. 1, the data sources 104 may comprise an image capture device such as a digital camera or a scanner, or a device that can synchronize with the computing device 102 such as a personal digital assistant (PDA).

As is further indicated in FIG. 1, the system 100 can also include one or more printing devices 106 that the computing device 102 may communicate with either directly or via a network 108. For instance, the computing device 102 may be connected to one printing device 106 that serves as a local convenience printing device and to a shared, high-capacity printing device through the network 108. Where a network 108 is used, it may comprise one or more sub-networks that are communicatively coupled to each other. By way of example, these networks can include one or more local area networks (LANs) and/or wide area networks (WANs), and may comprise a network that forms part of the Internet.

Shown connected to the network 108 is an information source 110 that, as illustrated, may comprise another computing device such as a server computer. As is discussed below, the information source 110 may be accessed to obtain print optimization information regarding one or more of the print data sources 104 such that the printing of data originating from those sources may be specifically optimized. As is further discussed below, the print data sources 104 themselves may also act as an information source.

The printing devices 106 comprise substantially any device that can receive print data and generate hardcopy outputs based upon the received data. As indicated in FIG. 1, the imaging devices 106 may comprise printers. Although printers are illustrated in FIG. 1 and have been explicitly identified herein, the imaging devices may be other devices including, for example, photocopying devices, multi-function peripheral (MFP) devices (also referred to as "all-in-one" devices), facsimile devices, etc.

Figure 2:
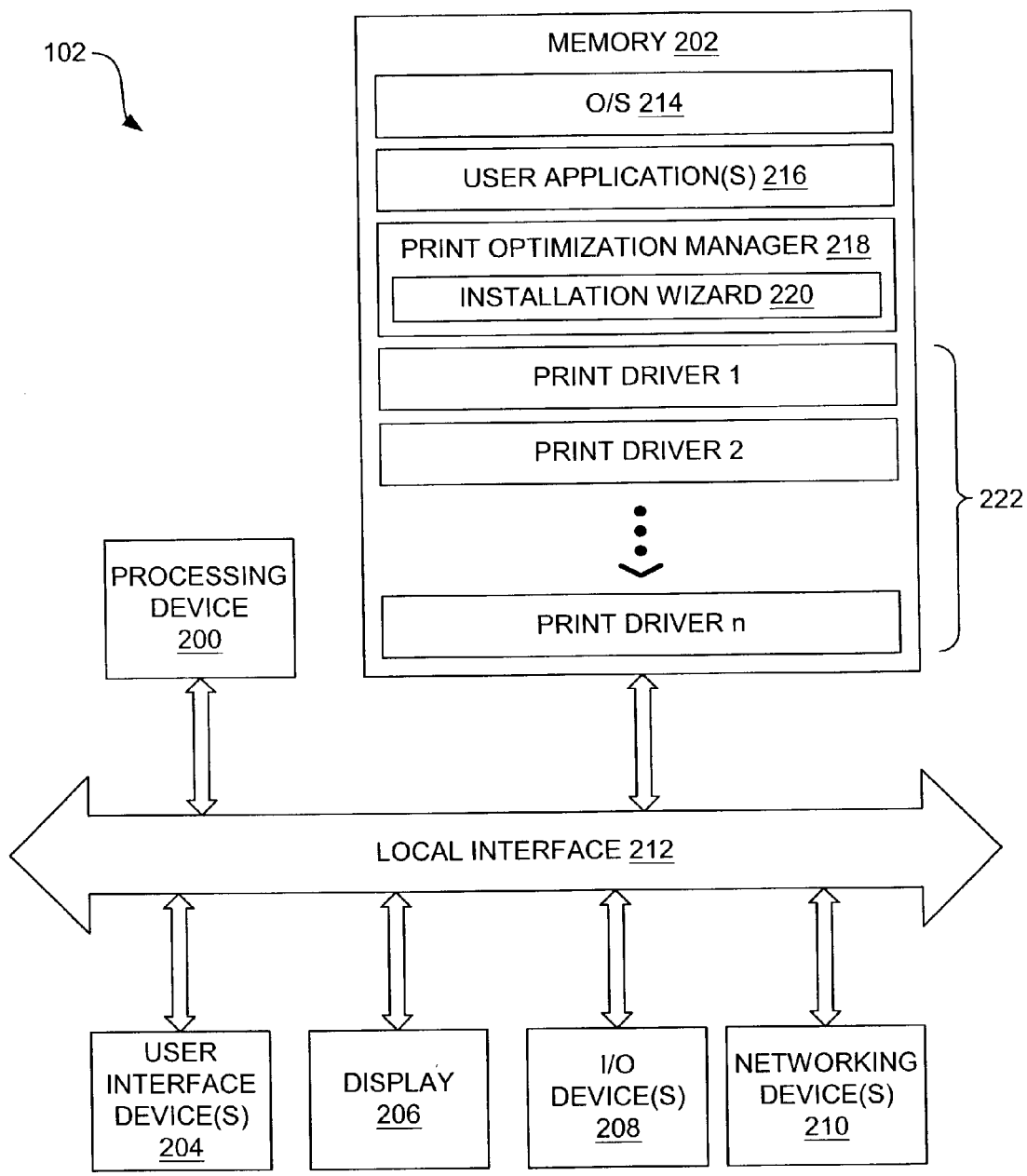
FIG. 2 is a block diagram of an embodiment of a user computing device shown in FIG. 1.

FIG. 2 is a block diagram illustrating an example architecture for the user computing device 102 shown in FIG. 1. As indicated in FIG. 2, the computing device 102 comprises a processing device 200, memory 202, one or more user interface devices 204, a display 206, one or more input/output (I/O) devices 208, and one or more networking devices 210, each of which is connected to a local interface 212, such as one or more internal buses.

The processing device 200 can include any custom made or commercially available processor, a central processing unit (CPU) or an auxiliary processor among several processors associated with the computing device 102, a semiconductor based microprocessor (in the form of a microchip), or a macroprocessor. The memory 202 can include any one or a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 204 comprise those components with which the user interacts with the computing device 102. Where the computing device 102 comprises PC or similar device, these components can comprise a keyboard and mouse. The display 206 is used to visually present data to the user and may, for example, comprise a cathode ray tube (CRT) or liquid crystal display (LCD) monitor.

The one or more I/O devices 208 comprise components used to facilitate connection of the computing device 102 to other devices and therefore, for instance, comprise one or more serial, parallel, small system interface (SCSI), universal serial bus (USB), or IEEE 1394 (e.g., Firewire™) connection elements. The networking devices 210 comprise the various components used to transmit and/or receive data over the network 108, where provided. By way of example, the networking devices 208 include a device that can communicate both inputs and outputs, for instance, a modulator/demodulator (e.g., modem), a radio frequency (RF) or infrared (IR) transceiver, a telephonic interface, a bridge, a router, as well as a network card, etc.

Stored within memory 202 are various programs (in software and/or firmware) including an operating system (O/S) 214 and one or more user applications 216. The O/S 214 controls the execution of other programs and provides scheduling, input-output control, file and data management, memory management, and communication control and related services. The user applications 216 comprise those programs used in conjunction with the print data sources 104 so that the data provided by the sources can be viewed and/or manipulated using the computing device 102. By way of example, the user applications comprise one or more imaging applications with which images captured by the print data sources 104 may be viewed, as well as a synchronization program with which data may be shared between a print data source and the computing device 102.

In addition to those programs, the memory 202 further comprises a print optimization manager 218 and one or more print drivers 222. As is described in greater detail below, the print optimization manager 218 facilitates optimization of the print drivers 222 for particular print data and/or print data sources 104. In some embodiments, the print optimization manager 218 may include a wizard 220 that automatically obtains print optimization information about print data sources 104 connected with the computing device 102.

Figure 3:
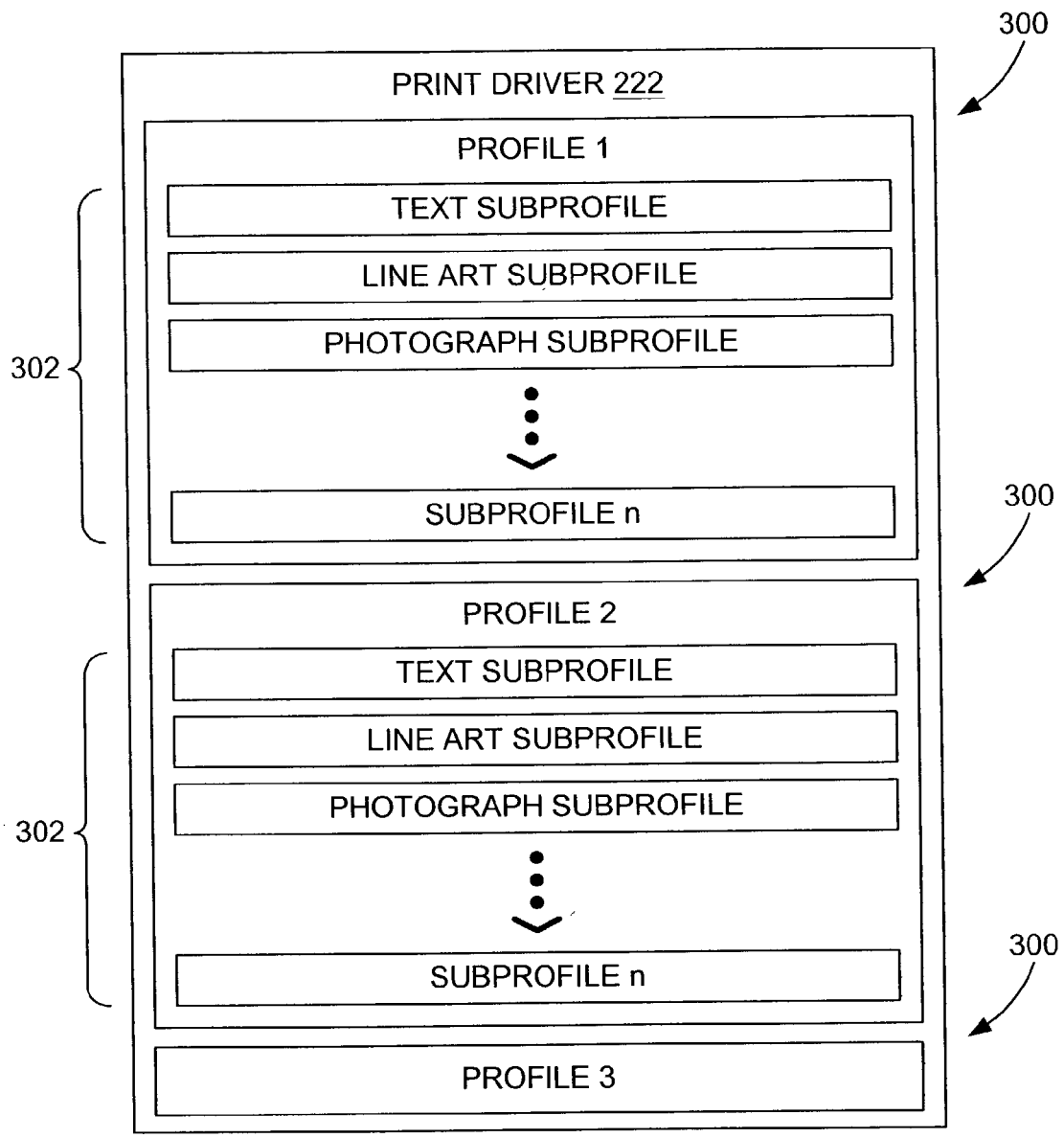
FIG. 3 is a block diagram of an embodiment of a print driver stored on the computing device of FIG. 2.

FIG. 3 provides an example embodiment of the print drivers 222 shown in FIG. 2. As indicated in FIG. 3, each print driver 222 may comprise various print profiles 300 (three shown in the figure), each of which pertaining to a given print data source 104. As is explained in greater detail below, the profiles 300 contain print optimization information with which the print driver 222 can be configured to optimize the print data received from the print data source 104 for printing on a printing device 106. One or more of the profiles 300 may include one or more subprofiles 302 that specifically pertain to the type of data being provided by the given print data source 104. For instance, as indicated in FIG. 3, the subprofiles 302 may pertain to printing text, line art, or photographs. Access and use of the profiles 300 are described in further detail below.

Figure 4:
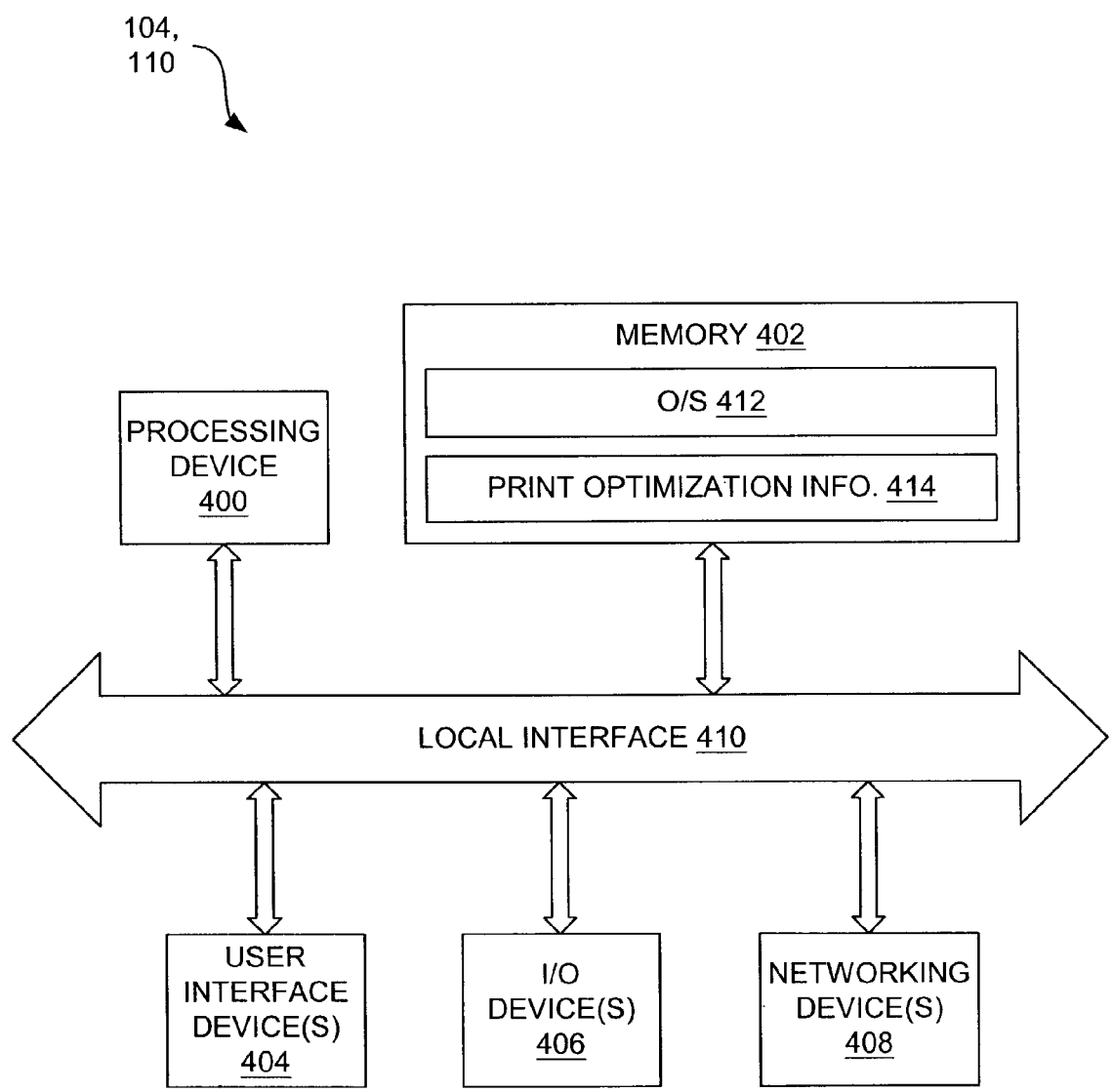
FIG. 4 is a block diagram of an embodiment of an information source from which print optimization information may be obtained.

FIG. 4 is a block diagram illustrating an example architecture for the information source 110, as well as the print data sources 104 when acting in the capacity of a source of print optimization information. As indicated in FIG. 4, the information source 104, 110 can comprise a processing device 400, memory 402, one or more user interface devices 404, one or more I/O devices 406, and one or more networking devices 408. Each of these components is connected to a local interface 410 that, by way of example, comprises one or more internal buses.

The processing device 400 is adapted to execute commands stored in memory 402 and can comprise a general-purpose processor, a microprocessor, one or more application-specific integrated circuits (ASICs), a plurality of suitably configured digital logic gates, and other well known electrical configurations comprised of discrete elements both individually and in various combinations to coordinate the overall operation of the device. The memory 402 can include any one or a combination of volatile memory elements (e.g., RAM) and nonvolatile memory elements (e.g., ROM, hard drive, etc.).

The user interface devices 404 comprise the tools with which a user interacts with the device and communicates commands to the device and may comprise, for instance, a keyboard, mouse, one or more function keys and/or buttons, and the like. The I/O devices 406 and networking devices 408 can have configurations similar to those of like-named components identified above with reference to FIG. 2.

Stored within memory 402 (in software and/or firmware) is an O/S 412 that contains the various commands used to control the general operation of the device, and print optimization information 414 that may be accessed by the computing device 104 and, more particularly, the print optimization manager 218 either during print driver installation, or upon receiving data that originated from a given print data source 104.

Various programs, have been described. It is to be understood that these programs can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. The programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example, an electronic, magnetic, optical, electromagnetic, infrared, or semiconductor system, apparatus, device, or propagation medium. More specific examples (a nonexhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

Example systems having been described above, system operation will now be discussed. In the discussions that follow, flow diagrams are provided. Any process steps or blocks in these flow diagrams may represent modules, segments, or portions of code that include one or more executable instructions for implementing specific logical functions or steps in the process. Although particular example process steps are described, alternative implementations are feasible. Moreover, steps may be executed out of order from that shown or discussed, including substantially or in reverse order, depending on the functionality involved.

Figure 5:
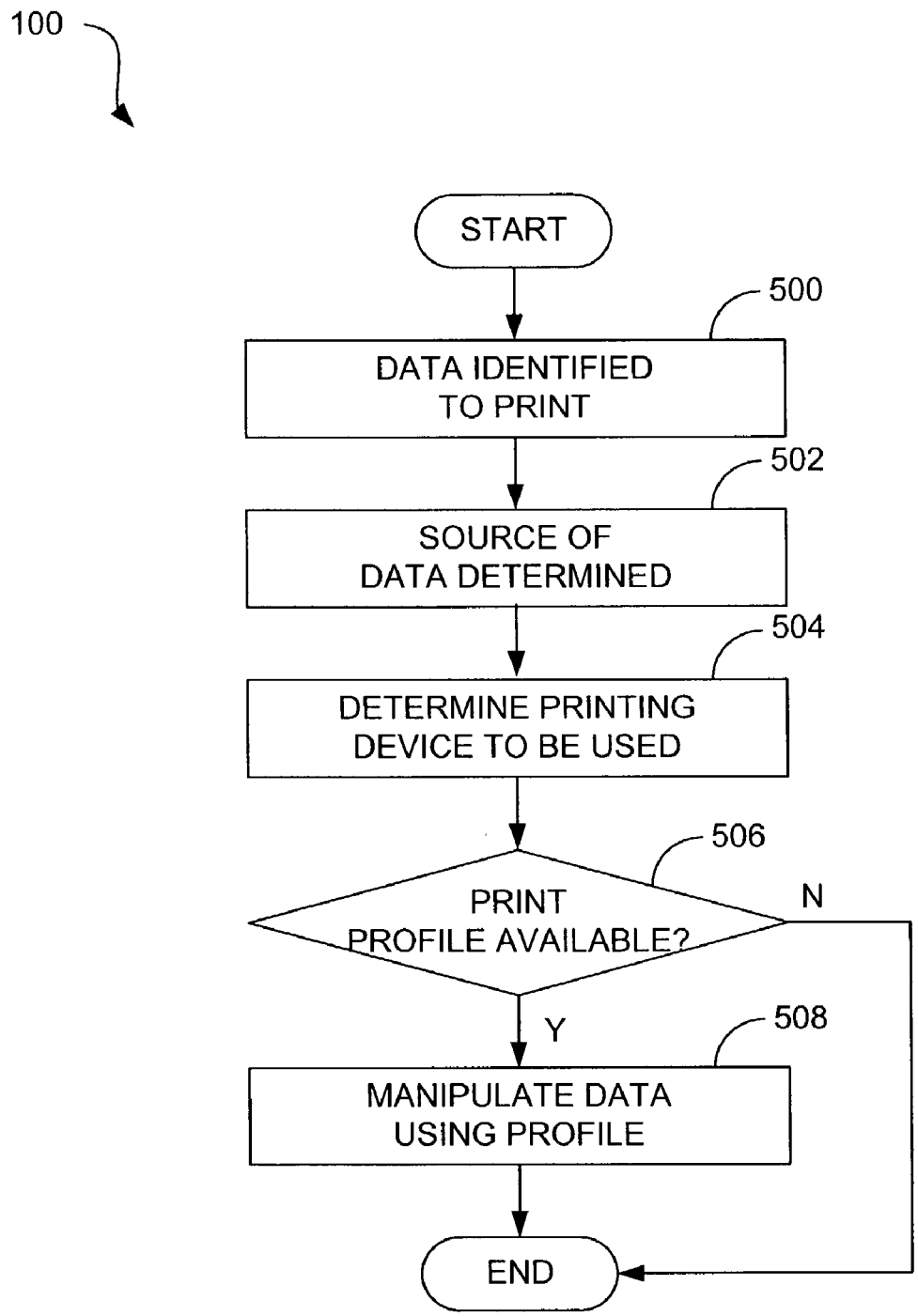
FIG. 5 is a flow diagram illustrating an embodiment of operation of the system shown in FIG. 1 in optimizing printing.

FIG. 5 illustrates a high-level example of operation of the system 100 in optimizing printing. Beginning with block 500, data to be printed is identified. This data typically comprises data from a user application 216 that is associated with the print data source from which the data originated. For instance, the data may comprise image data captured with a digital camera or scanner and accessed (e.g., viewed) via an imaging application on the user computing device. Next, as indicated in block 502, the source of the data is determined. This determination is straightforward in situations in which a user application specifically configured for use with a particular print data source is implicated. For instance, where a synchronization application that is provided along with a PDA is used to view text prior to being sent to a printer, the source of the data is known.

In other circumstances, the source of the data may not be known and must be determined through other methods. This may be the case, for example, if a generic imaging application is used to view captured image data that is to be printed. In one method, the user may simply be prompted to identify the source of the data using, for instance, a dialog box of the user application 216. In another method, the source of the data may be determined by identifying the devices that are connected to the user computing device, for example by accessing a device registry. In yet a further method, information regarding the source of the data, for instance an identification string of the device, may be contained within the data, for example in a header, so that the source may be determined by reading the source information.

Irrespective of the manner in which the source determination is made, it is next determined what printing device is going to be used, as indicated in block 504, so that the respective configurations of both the print data source and the printing device may be considered prior to manipulating the print data before sending it to the printing device. Where the print driver 222 is specifically designed for use with a particular printing device, this determination is straightforward. Where the driver is generic to two or more different printing devices, however, the printing device to be used is determined from a user selection (e.g., menu selection).

With reference next to decision block 506, it is determined whether, for the print data source and printing device combination determined above, a print profile 300 is available that, when applied, will optimize the print data for printing on the selected printing device so that the best print results will be obtained. The print profile 300 may already exist in computing device memory if it was previously stored, for example, during a print driver installation procedure. For instance, during installation of a print driver 222, the installation wizard 220 of the print optimization manager 218 could have detected all print data sources connected to the user computing device and, upon detection, installed any print profiles known (e.g., stored on a CDROM) for the detected print data sources. In another scenario, the print profile 300 may have been affirmatively stored by the user after purchasing a print data source (e.g., digital camera). In a further alternative, the print optimization manager 218 may have obtained print optimization information used to create a print profile 300 by communicating with one or more information sources (see e.g. FIG. 6).

If no print profile 300 is available, no print optimization is possible and flow for the optimization session is terminated. If, on the other hand, a print profile 300 is available, flow continues to block 508 and the print data is manipulated using the profile so as to optimize the data for printing on the selected printing device. During this manipulation, the particularities of the print data source are taken into account as well as those of the printing device. Many different types of optimizations are available. To cite one example, if the print data source comprises a digital camera that is only capable of 256 different colors while the printing device is color printer capable of many more, optimization can comprise representing the print data only using 256 colors to avoid a translation into a greater number of colors which could actually reduce print quality. The inverse optimization is also possible. For example, if a digital camera is capable of 32,000 colors and a color printer only recognizes 256, the print data can be optimized in such a manner so as to emulate the color capabilities of the camera as closely as possible.

Another form of optimization that is available relates to image resolution. If, for instance, the print data source is a scanner that has a scan resolution of 4800 dots per inch (dpi) and the printing device is a printer that prints at a maximum of 1200 dpi, optimization may be provided in determining which bits of information to discard based upon the manner in which the particular scanner represents an image. In another example, optimization may mean pass-through printing. For example, if the print data source is a digital camera that captures JPEG images, optimization may be to enable pass-through JPEG printing so as to avoid a situation in which the print driver 222 converts the data in a manner that decreases print quality. To cite a non-image capture example, optimization may comprise font substitution where the print data source comprises a PDA that has a limited number of fonts and/or where these fonts do not print well with a particular printing device.

As can be appreciated from the foregoing, many different types of optimizations are feasible where knowledge of both the print data source and printing device are considered together. This knowledge may most readily be available where the print data source and the printing device are manufactured by the same manufacturer. In such a case, the consumer may be motivated to purchase print data sources and printing devices of the same manufacturer so that optimized printing can be obtained. As is discussed below in reference to FIG. 6, other optimizations may be achieved when the particular nature of the data is also considered.

Figure 6:
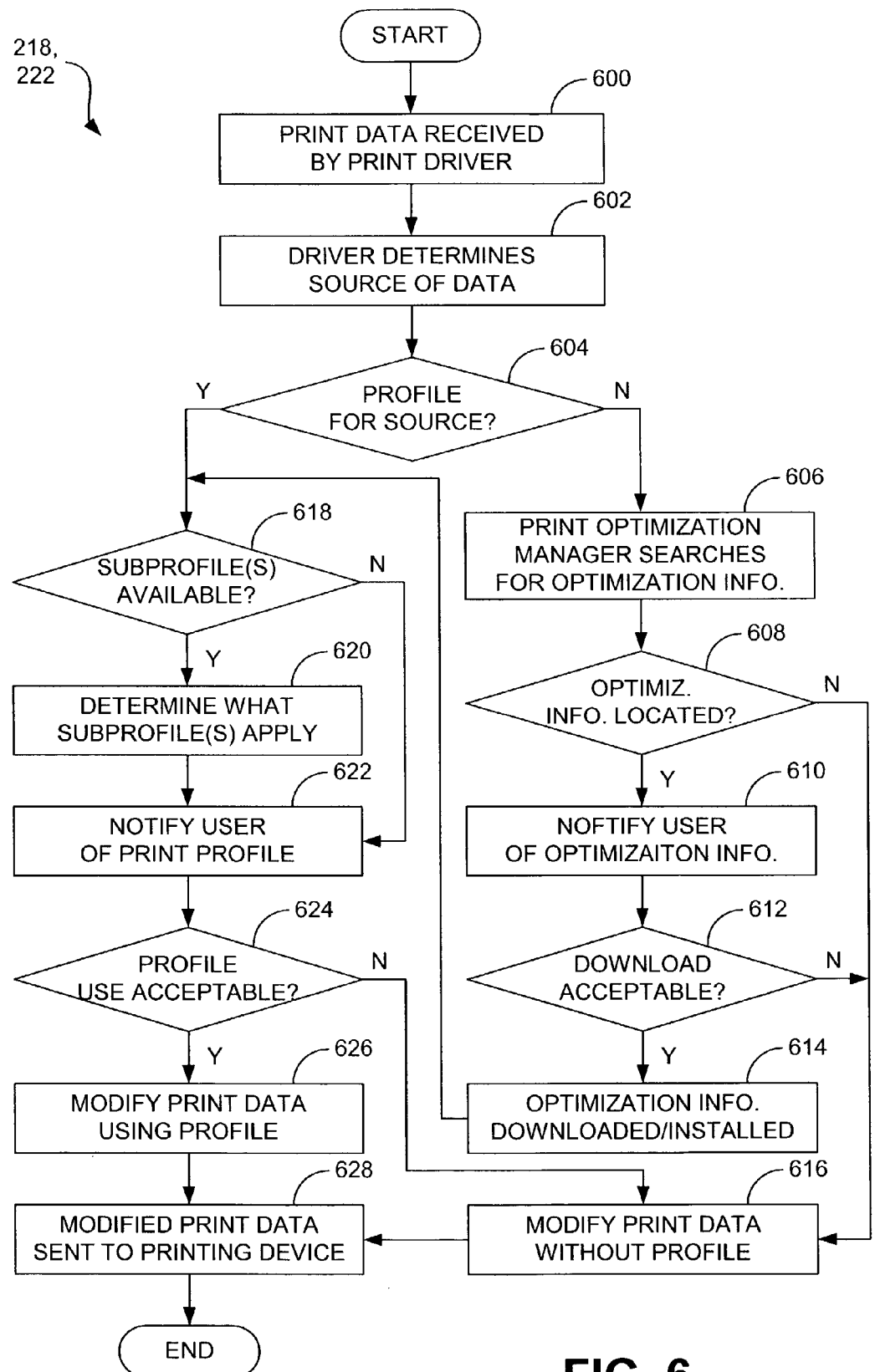
FIG. 6 is a flow diagram that illustrates an embodiment of operation of a print optimization manager and a print driver of the user computing device of FIG. 2 in optimizing printing.

FIG. 6 illustrates a detailed example of operation of the print optimization manager 218 working in conjunction with a print driver 222, which is configured for use with a particular printing device, in facilitating print optimization. Beginning with block 600 of the figures, print data is received by the print driver 222. As described above, this data typically comprises data originated by a print data source and provided to the driver 222 by a user application 216. Once the data is received, the driver 222 determines the source of the data, as indicated in block 602. As identified in the discussion of FIG. 5, where the source of the data is not already known, this determination may comprise one of prompting the user to identify the source, identifying the devices that are connected to the user computing device, or reading a header associated with the data.

Once this determination has been made, the print driver 222 determines whether it has a print profile 300 for that particular print data source, as indicated in decision block 604. If there is no such print profile 300, flow continues to block 606 at which the print optimization manager 218 searches for print optimization information that may either comprise a print profile for the print data source or that may be used to generate such a profile. In one case, the print optimization manager 218 may prompt the user to provide the print optimization information. For example, such information may be contained on a CDROM or other storage medium that was provided along with the printing device. In an alternative case, the print optimization manager 218 may access a Web site, for example a site hosted by an information source 110 of the print data source manufacturer to query the manufacturer as to whether any such information is available. In another alternative, the print optimization manager 218 may query the print data source itself (via its connection to the user computing device) to determine whether any such information is stored within memory of the source.

If, at decision block 608, no such optimization information is available, flow continues down to block 616 at which the print data is modified (i.e., translated) by the print driver 222 in its standard, preset manner without use of a print profile 300. If, on the other hand optimization information is available, the user may be notified of the existence of the information, as indicated in block 610, and may be queried as to whether downloading of the information is acceptable. With reference to decision block 612, if downloading is not acceptable to the user, flow continues to block 616 described above. However, if downloading is acceptable, the print optimization information is downloaded to computer device memory and installed into the print driver 222.

Figure 7:
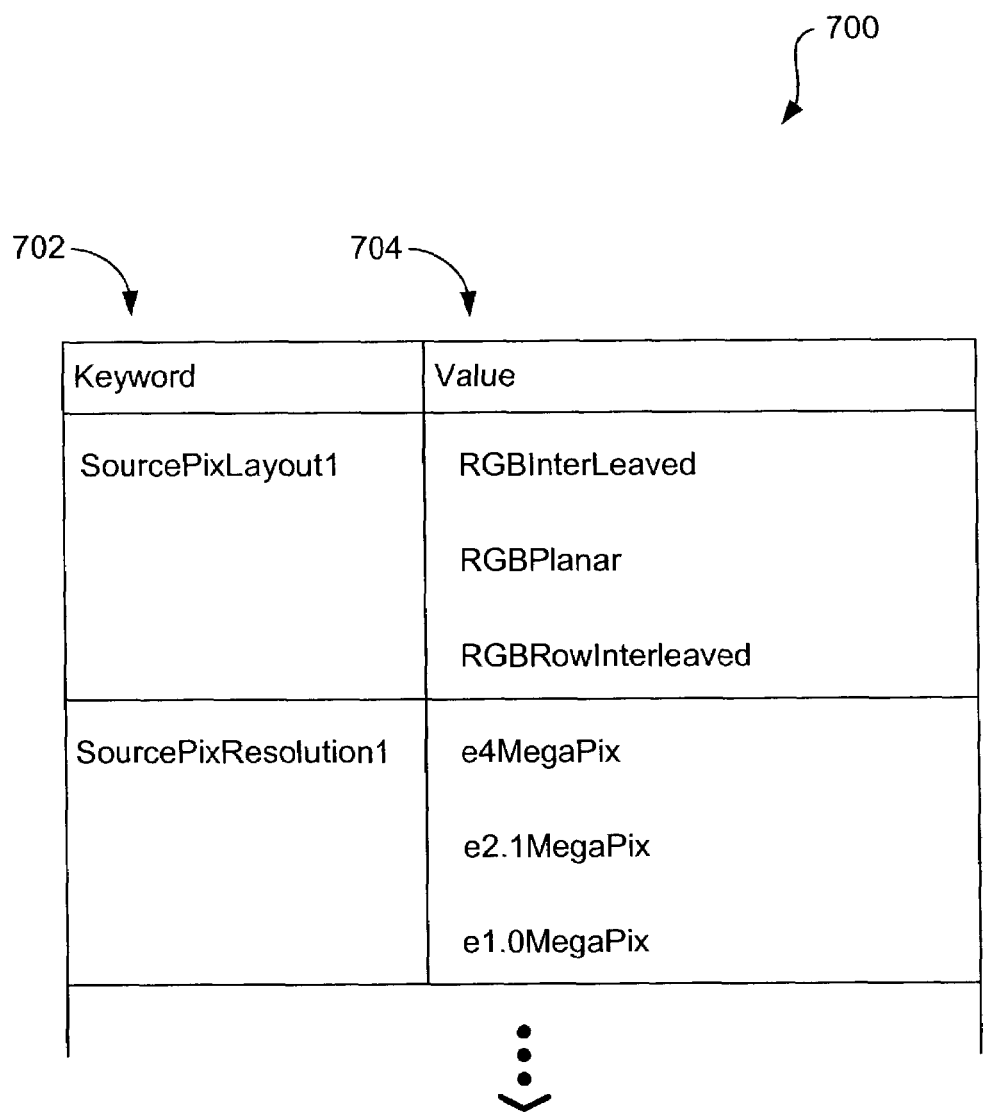
FIG. 7 is an example print profile that may be used to optimize printing.

If a print profile 300 was located by the print driver 222 at decision block 604, or if print optimization information was downloaded and installed at block 614, a print profile 300 will be available for use in optimizing the print data. FIG. 7 provides a portion of an example print profile 700 that may be used by the print driver 222. In this example, the print profile 700 is that of a digital camera. As indicated in FIG. 7, the profile 700 specifies the pixel layout and pixel resolution of the camera. Although only these two pieces of information have been identified, various other information about the print data source may be included in the profile 700. This information can be stored in a binary format that is similar to a dictionary structure. In such a structure, a keyword 702 and a value 704 are used to form keyword/value pairs that identify a given property and an associated value. A termination mechanism can be used to denote the end of an existing pair and the beginning of a new one. This termination mechanism may comprise data bytes that specify the size of each keyword/value pair, by including offsets to the beginning of each entry, or special termination bytes.

Where the print optimization information is not in the form of an implementable print profile 300, the print optimization manager 218 may use the information to create such a profile for the given print data source. Next, with reference to decision block 618, the print driver 222 determines whether there are one or more subprofiles 302 in the located profile 300. Such subprofiles may be optimized for specific types of print data. For example, as discussed above in reference to FIG. 3, separate subprofiles 302 may be provided for each of text data, line art data, and photograph data. If subprofiles 302 are available, the print driver 222 may determine which, if any, of these subprofiles 302 applies to the particular print job that is being processed, as indicated in block 620. This determination may simply comprise querying the user as to the nature of the print data or analyzing the print data to make a determination as to its type (e.g., text versus image). In addition to the use described above, the subprofiles 302 may be used as "quick sets" that the user may select any time he or she thinks a given subprofile will provide the desired effect.

Assuming the print driver 222 has not already notified the user, the print driver may notify the user as to the existence of the print profile 300 (and subprofile 302 where applicable), as indicated in block 622, and query the user as to whether it is acceptable to apply the profile when processing the print data. With reference next to decision block 624, if use of the print profile is not acceptable, flow returns to block 616 described above. If such use is acceptable, however, flow continues to block 626 at which the print data is modified using the print profile 300, and subprofile 302 if any, so as to optimize the print data for printing by the selected printing device. As described above, this modification can comprise a variety of different print data source-specific optimizations. Once the appropriate modifications have been completed, flow continues to block 628 at which the modified print data is sent to the printing device.

While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A method performed on a computing device for optimizing printing, the method comprising:
   determining an identity of a source of data to be printed;
   using the identity to locate a print profile for the data source, the print profile being specific to particular data source;
   identifying subprofiles contained within the print profile, the subprofiles each pertaining to a type of data to be printed;
   determining which subprofile applies to the data to be printed by analyzing the data to be printed with the computing device to determine the data's type; and
   manipulating the data to be printed using the print profile and one of its subprofiles so as to optimize printing.

2. The method of claim 1, wherein determining an identity of a source of the print data comprises the computing device identifying an image capture device that originated the print data.

3. The method of claim 1, wherein determining an identity of a source of the print data comprises the computing device determining what devices are connected to the computing device.

4. The method of claim 1, wherein determining an identity of a source of the print data comprises the computing device reading identification information contained in a header of the print data that identifies the data source.

5. A method performed on a computing device for optimizing print data for printing in relation to a source of the print data, comprising:
   determining with a driver of the computing device the identity of the print data source;
   using the identity to determine whether a print profile for the data source is already resident on the computing device;
   querying the data source to request the data source to provide print optimization information if a print profile is not already resident on the computing device;
   downloading the print optimization information from the data source from the other device if print optimization information is located; and
   manipulating the print data using the downloaded print optimization information.

6. The method of claim 5, wherein determining the identity of the data source comprises determining what devices are connected to the computing device.

7. The method of claim 5, wherein determining the identity of a source comprises reading identification information contained in a header of the print data that identifies the data source.

8. A system for optimizing printing, the system comprising:
   a plurality of print profiles, each specific to a particular originating source of data to be printed, the print profiles comprising information as to attributes of the source of data to which they pertain, the print profiles further comprising subprofiles that relate to particular types of data to be printed; and
   a print driver configured to receive print data from an originating source of data, determine the identity of the originating source, identify the print profile for that particular originating source, determine which subprofile of the identified print profile applies to the data to be printed by analyzing the data to be printed to determine the data's type, and manipulate the data to be printed using the print profile and one of its subprofiles so as to optimize printing.

9. The system of claim 8, further comprising a print optimization manager configured to download a print profile if a print profile specific to the originating source is not already resident on the computing device.

10. A print optimization manager that executes on a computing device, comprising:
    logic configured to determine the identity of a print data source from which print data originated;
    logic configured to use the identity to determine whether a print profile for the data source is already resident on the computing device;
    logic configured to query the print data source for the print profile if a print profile is not already resident on the computing device;
    logic configured to facilitate downloading of the print profile from the print data source; and
    logic configured to install the downloaded print profile within a print driver.

* * * * *

UNITED STATES PATENT AND TRADEMARK OFFICE
CERTIFICATE OF CORRECTION

PATENT NO. : 7,385,728 B2
APPLICATION NO. : 10/269196
DATED : June 10, 2008
INVENTOR(S) : Daniel Travis Lay et al.

Page 1 of 1

It is certified that error appears in the above-identified patent and that said Letters Patent is hereby corrected as shown below:

In column 9, lines 42-43, in Claim 5, after "source" delete "from the other device if print optimization information is located".

Signed and Sealed this

Eleventh Day of August, 2009

David J. Kappos
*Director of the United States Patent and Trademark Office*